United States Patent
Kuznetsov et al.

(10) Patent No.: US 9,282,258 B2
(45) Date of Patent: Mar. 8, 2016

(54) ACTIVE MICROWAVE DEVICE AND DETECTION METHOD

(71) Applicants: Andrey Kuznetsov, St. Petersburg (RU); Valery Averyanov, St. Petersburg (RU); Igor Gorshkov, St. Petersburg (RU)

(72) Inventors: Andrey Kuznetsov, St. Petersburg (RU); Valery Averyanov, St. Petersburg (RU); Igor Gorshkov, St. Petersburg (RU)

(73) Assignee: APSTEC SYSTEMS USA LLC, Owings Mills, MD (US)

( * ) Notice: Subject to any disclaimer, the term of this patent is extended or adjusted under 35 U.S.C. 154(b) by 235 days.

(21) Appl. No.: 14/160,895

(22) Filed: Jan. 22, 2014

(65) Prior Publication Data

US 2015/0208003 A1    Jul. 23, 2015

(51) Int. Cl.
*H04N 5/30* (2006.01)
*H04N 13/02* (2006.01)
*G06K 9/46* (2006.01)

(52) U.S. Cl.
CPC ............... *H04N 5/30* (2013.01); *G06K 9/4604* (2013.01); *H04N 13/02* (2013.01)

(58) Field of Classification Search
None
See application file for complete search history.

(56) References Cited

U.S. PATENT DOCUMENTS

2011/0050480 A1 *  3/2011  Kroning ............... G01S 7/025
                                                  342/27

* cited by examiner

*Primary Examiner* — Hung Dang
*Assistant Examiner* — Sunghyoun Park
(74) *Attorney, Agent, or Firm* — Nadya Reingand

(57) ABSTRACT

Disclosed herein is a method and system for detecting potentially hazardous and/or explosive material concealed under clothing or in luggage. Through the emission, reflection, and reception of microwave radiation, a 3D image of a targeted area can be constructed. The image will show the outline of a moving person as well as any dielectric objects potentially hidden on their body. By measuring phases and amplitudes of microwaves reflected off a dielectric object, the optical path of the microwave through a hidden object can be determined, thus allowing for the creation of a 3D microwave image of a targeted area. Several emitters and receivers can be utilized at once, and video imaging can also be superimposed over the microwave image for improved detection accuracy. The invention has security and safety applications across the nation, particularly in areas of mass transit and large public events.

17 Claims, 8 Drawing Sheets

US 9,282,258 B2

ACTIVE MICROWAVE DEVICE AND DETECTION METHOD

CROSS-REFERENCE TO RELATED APPLICATIONS

This patent application is a Continuation-in-Part of U.S. patent application Ser. No. 13/403,256, filed Feb. 23, 2012, and incorporates said application fully by reference.

FIELD OF THE INVENTION

This invention relates to the field of remote detection of hidden objects, particularly to methods and apparatuses for detection of dielectric explosive substances concealed under clothes or otherwise on or near the human body.

BACKGROUND OF THE INVENTION

Currently, various methods are being used to combat the concern regarding concealed explosive substances. Some of these methods include: metal detectors, vapor detectors, X-ray machines, and dogs. Many countries are putting forth great efforts in developing new methods for inspection of the human body based on new physical principles including: Raman backscattering, dielectric portals, passive and active terahertz range devices, passive millimeter range radars, and active microwave portals.

The aforementioned methods do not guarantee the required effectiveness of remote and covert inspection; thus, these devices are not capable of detecting a "suicide bomber" in adequate time so that the necessary precautions can be taken before detonation of the explosive device occurs. Another notable disadvantage of the current methods is the lack of automatic determination of the threat level of a detected object as well as a high false alarm rate. These obstacles make it nearly impossible to use such devices, e.g., for inspection of a large number of people moving in transit.

One current method of detection used for metallic and non-metallic explosive devices concealed on a person is as follows: The receiving antenna focuses on a small area of the human body using electromagnetic waves coming from that region. A radiometer data is then processed in a processing module, and the intensity and position of the beam is recorded. The measured intensity of the received signal is then displayed as luminous intensity. By analyzing the distribution of the luminous intensity, the presence or absence of metallic or non-metallic objects can be determined. The main disadvantage of this method is the low contrast of the received image. This method cannot clearly distinguish non-metallic objects from the human body while the dielectric for the used wave range is transparent.

There is a need for covert automatic (without operator) inspection of a crowd of moving people to unveil suicide bombers and separate them from the crowd.

SUMMARY OF THE INVENTION

This invention discloses a method and system for locating potentially threatening hidden objects, such as explosives, worn on or carried by a person. By sending microwave signals and receiving the reflections of those signals off of different areas of the person, the distance between an outer layer (i.e. outer garment) and the body of the person can be calculated. Simultaneously, if an object is hidden on the person, the thickness of the object is also calculated. These values are compared and used to create a 3D microwave image, and if a sharp change between the values is detected, an alarm is signaled. The sharp change is due to the increased dielectric permittivity constant of certain dielectrics used for explosives and other dangerous weapons, which changes the speed at which the microwave signal is transmitted. This invention also discloses a similar method of detection by placing microwave signal emitters across from signal receivers, thus allowing for calculations based on the transmission, rather than reflection, of microwave signals. Additionally, a 3D video image of the same point in time can overlap the 3D microwave image, thus allowing for more accurate readings and results.

BRIEF DESCRIPTION OF THE DRAWINGS

FIG. 3(b) shows an example of the location of explosives on the human body under the coat or other garment. FIGS. 3(c) and 3(d) show the optical paths and distances measured or calculated by the claimed invention in the case of hidden objects.

DETAILED DESCRIPTION OF THE PREFERRED EMBODIMENT

Disclosed herein is an Active Microwave Device (AMD) for stand-off real-time automatic detection of IEDs (Improvised Explosive Devices) and other potentially dangerous dielectric objects worn on the body and hidden under clothing or in a back-pack or other luggage. The AMD operates by sending microwaves (ranging in wavelength from 1 millimeter to about 20 centimeters, with the preferred embodiment using microwaves ranging from 1 mm to a few cm) towards a moving target (e.g., a person), and detecting the scattered and transmitted waves afterwards. The data analysis is carried out in real time by high-speed GPUs to obtain the image of a potentially hidden object and receive information about its volume and dielectric properties, which allows distinguishing between a common object and a potential explosive. This information is then used to automatically assign a threat level to the found 'anomaly' without an operator's involvement.

Figure 1:
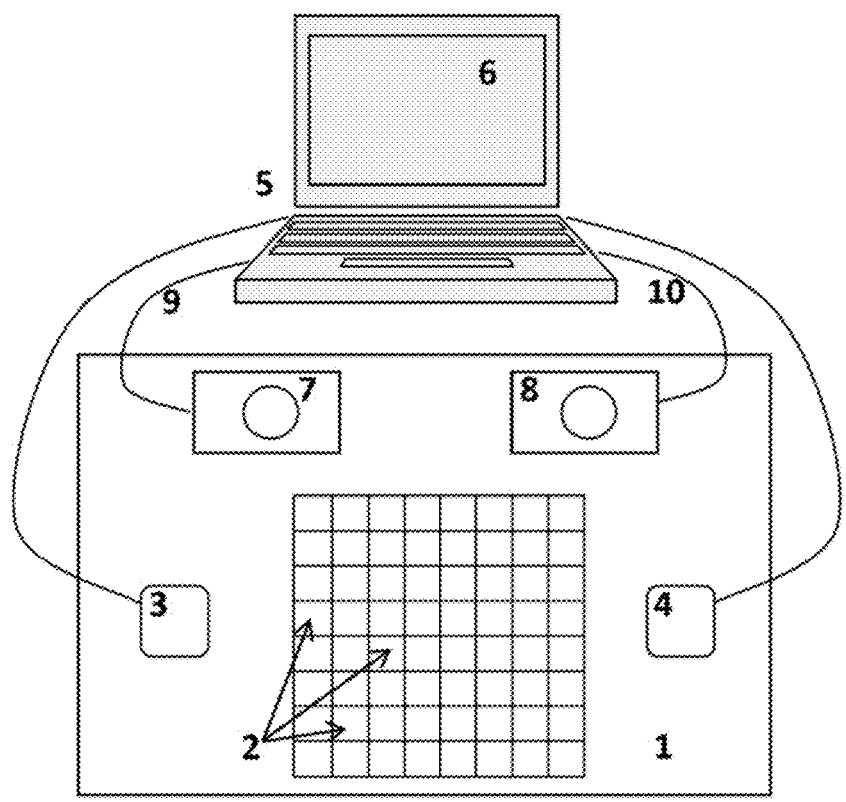
FIG. 1 shows the setup for detection of hidden dielectric objects.

A setup 1 for unveiling hidden dielectric objects is shown in FIG. 1. In one embodiment, the space is scanned with microwave radiation using two or more elemental microwave emitters 2 (FIG. 1 shows 64 emitters, as an example). The signal reflected from the monitored area is picked up by one or more parallel detection channels 3 and 4. The received signal undergoes coherent processing in a digital signal processing (DSP) unit 5 to obtain maximum intensity values of the restored configuration of scattering objects in the monitored area, depending on the distance from the elemental emitters to the target. The information obtained after processing is then displayed on the display 6 by constructing 3D microwave images.

In another embodiment, an additional video image of the target is also obtained using two or more video cameras 7 and 8, which are synchronized with the microwave emitters 2 via the DSP unit 5. The obtained video images are transmitted via channels 9 and 10 into the processing unit 5, they are further converted into digital form, and a three-dimensional image of the target is constructed and shown on the display 6. The 3D video image and the 3D microwave image are then transferred into a general coordinate system and overlapped (described in further detail hereinafter). The viewpoint, or perspective, of the system 1 as shown in FIG. 1 is from the position of the person being monitored.

Figure 2:
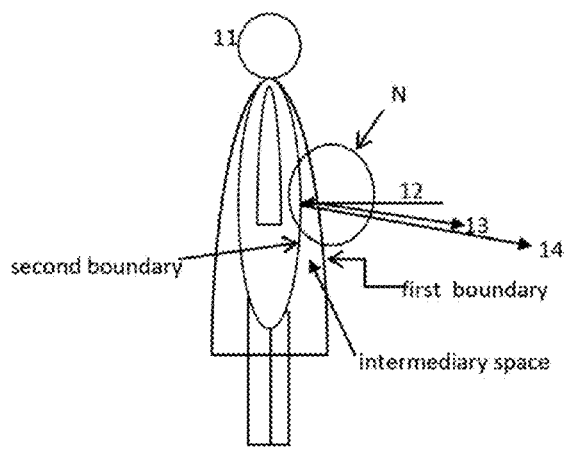
FIG. 2 shows the microwave path and reflection off a target's coat and body boundaries (first and second boundaries, respectively).

3D Microwave Imaging. Determining the presence of a potentially hazardous object carried by a target 11 is done in the following manner (FIG. 2). Some of the primary emitted MW radiation 12 is partially reflected by the first boundary (usually the person's coat/jacket/outer garment) forming a reflected beam 13 (see FIG. 3(*a*)—an enlarged view of area N—for greater detail). The same radiation/wave then travels through the coat until reflected by the second boundary, the human body, forming a second reflected beam 14. Thus, at least two reflections of the same wave occur—one reflection occurs at the outer boundary of the target and/or object (i.e. the first border, or air/intermediary space border) and another reflection occurs after the wave travels through the intermediary space and reflects off the target's body (i.e. the opposite side of the hidden dielectric object, if present). The measured distance P1 of the intermediary space between the first and second boundaries is recorded and used to detect the presence of hidden objects, P1=(A2−A1) is the distance between the point A2 on the second boundary and corresponding point A1 on the first boundary. This process is repeated continuously for other points, allowing microwave beams to hit and reflect off of various locations along the first and second boundaries. Each additional microwave beam that reflects off additional locations along the first and second boundaries B1, C1, D1, . . . and B2, C2, D2, . . . allows for measurement of additional distances P2, P3, P4, . . . between first and second boundaries. With microwave signals being transmitted and received continuously, 3D microwave images of the inspected area are created. The first 3D MW image corresponds to the first boundary, and the second 3D MW image corresponds to the second boundary. The method allows determining the presence of hidden dielectric objects on the human body under the outer garment or carried by the person.

Figure 3:
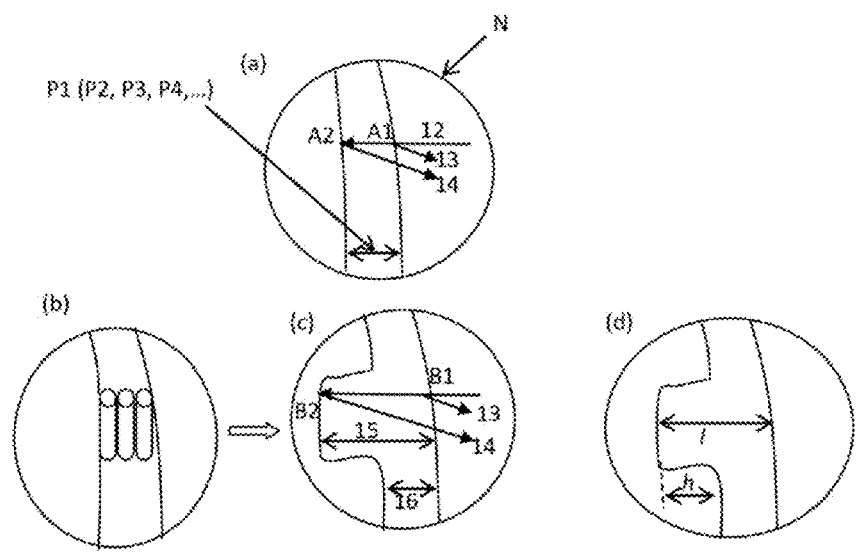
FIG. 3 further details a microwave (MW) beam's reflection in (a) the absence, and (b), (c), (d) the presence of hidden dangerous objects.

Area N is enlarged and shown in greater detail in FIG. 3(*a*). FIG. 3(*a*) represents a situation without a hidden object. FIG. 3(*b*) illustrates how an explosive might be worn on the body under a coat. The dielectric constant of explosives is about three. The MW radiation traveling through a medium with such a high dielectric constant is equivalent to traveling a longer distance in air and thus the microwave image of a hidden object is portrayed as a cavity protruding into the body, as illustrated by FIG. 3(*c*). This seemingly longer distance corresponds to a sharp change of the microwave beam path length, which is detected by the receivers because the MW beam in a first area 15 contains extra path gain compared to the MW beam in a second area 16. By measuring the phase and amplitude of incoming reflected microwaves, the microwave path (i.e. the path of the microwave beam/signal) can be determined and the sudden sharp change of the path in certain areas, if present, is registered. Because a microwave travels more slowly in an object with a higher dielectric (permittivity) constant, a second border signal takes longer to arrive in the presence or area of an object (compared to areas where no object is present, e.g., just above, below, or to either side of an object.). If the change in path value exceeds a preset threshold amount, it serves as an indication that a hidden object is present. In the preferred embodiment, the threshold amount is equal to the resolution of the system in the direction perpendicular to the first and the second boundaries. In the preferred embodiment the resolution was equal to 1 cm. The resolution depends on the bandwidth of the MW frequencies used.

The additional path, h (see FIG. 3(*d*)), is equal to $h=l(\mathcal{E}^{1/2}-1)/(\mathcal{E}^{1/2})$, where l is the thickness of the intermediary space, which equals the distance from the first boundary to the second boundary including the cavity, if present, as shown by the first area 15 (see FIG. 3(*c*)), and $\mathcal{E}$ is the dielectric (permittivity) constant of the intermediate space. The additional path, h, is calculated by subtracting the measured value of the second area 16 from the measured value of the first area 15.

It should be noted that the signal received from the first border, due to its small value, may be disrupted by the side lobes (i.e. secondary maximums) of the signal from the second border. Based on the difference in signals reflected from the first and second borders, the case might be that only the second border can be authentically reconstructed. If the signal/noise ratio is sufficient, then the first and the second borders are used to reconstruct two 3D MW images of the person, one corresponding to the outer garment and the other corresponding to the human body, as described above.

Simultaneously, MW radiation is emitted from various different angles and the reflected radiation, also travelling from various different angles, is similarly processed, allowing for accumulation of additional data to improve the accuracy and resolution of the image and detection process. Various configurations of setups are described further below.

Figure 4:
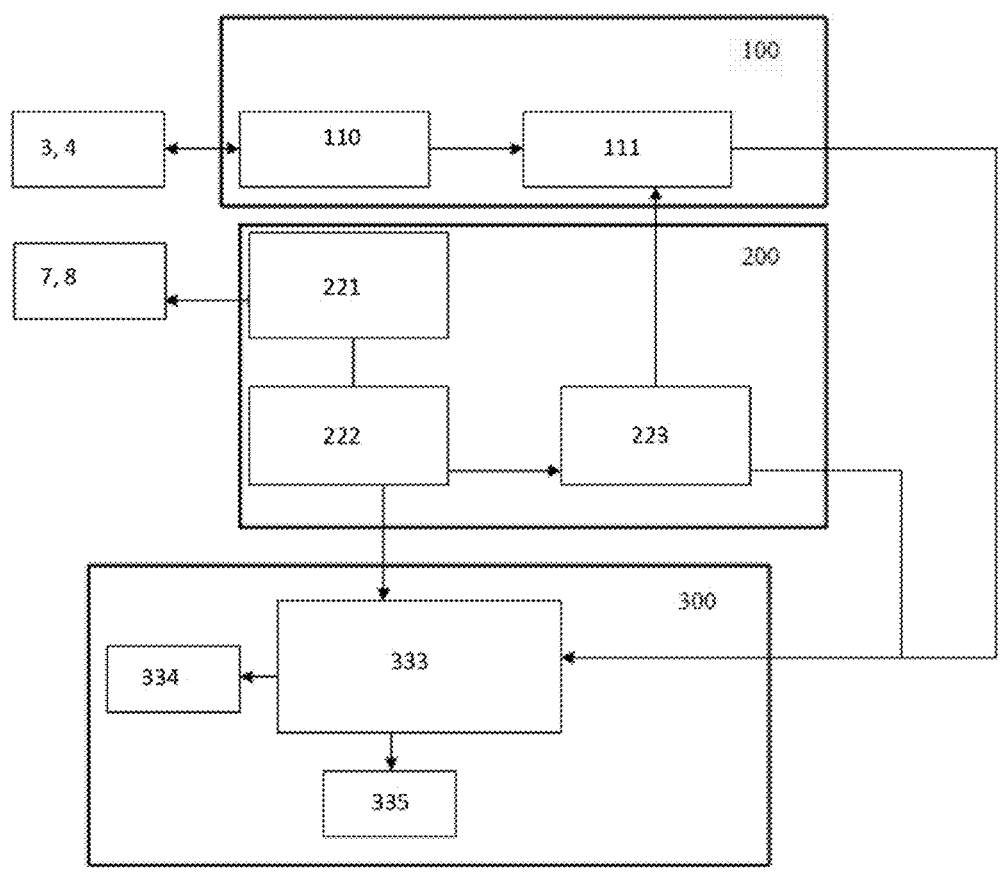
FIG. 4 shows an example of the process used for 3D microwave and video image processing and automatic alarm.

If the signal/noise ratio is insufficient (i.e., the signal from the first border is too distorted or too weak), then a synchronized video image border is used (see FIGS. 1 and 4).

Simultaneous 3D Video and MW Imaging.

Additionally, a 3D video image of the target is recorded at the same time of a MW image. In the preferred embodiment at least two video cameras 7 and 8 (see FIG. 1) record images of the target, and the DSP unit 5 reconstructs a 3D video image of the object. Optical beams do not penetrate the outer boundary (i.e., the person's outer garment in the example herein). This 3D video imaging is synchronized in time with the 3D microwave imaging. Overlapping the 3D video image over the 3D MW image of the outer border achieves improved accuracy of the position of the outer border and improved calculation of the additional path, h.

In one embodiment, the system is additionally equipped with an automatic alarm, which triggers a sound or a visual alert if the distance h is above a predetermined threshold value and thus the presence of a hidden object(s) is suspected.

In another embodiment, the automatic alert is combined with a photo of the suspected person, his/her coordinates, and the location of the hidden object(s) detected on his/her body, to security officers and first responders. The resolution of the system is sufficient to detect potentially hazardous objects on the human body without violating any privacy issues.

In yet another embodiment, the microwave image processing software creates an alert for only those parts/objects of targets which raise concern (i.e. create an alarm in the system due to microwave image detection). And finally, only those parts/objects of targets which raise concern are extracted from the video image by the processing software. Thus, without reconstructing the entire inspection area, to spare resources and time, the processing software creates a 3D microwave image with a superimposed 3D video image of only those parts/objects and areas of significance to security and the detection of potential threats.

Setup Configurations.

The AMD can be produced and set up in two different geometries: (1) as a walk-through portal inspecting multiple moving persons (preferably in a manner where the persons are not shadowing one another, i.e. one by one, or side by side); or (2) as a single module for stand-off inspection of multiple moving targets. The AMD can be used in a mass-transit environment in various scenarios and as a stand-alone system or in combination with other sensors, video tracking, and data fusion systems. The AMD can be used in combination with automatic doors (for example, revolving entrance doors) or gates, which could be instantly closed when a real-time automatic alert is received from the AMD. The scenario also allows for separating instantly suspicious persons from other people.

The advantages of the present invention include, but are not limited to: (1) Standoff detection at a distance (for example, 10 meters); (2) Real-time inspection of targets (ten or more frames per second); (3) Inspection of many targets at a time (at least 4-5 at a time); (4) Covert inspection and installation (the device can be masked, e.g., as an advertising panel); (5) Safe operation and radiation (the total microwave power is 30 times less than that allowed in a public area); (6) Specificity to dielectric objects (the dielectric constant of an explosive is about or above 3, while innocent goods have a constant of less than 2.5); (7) Specificity to metallic objects; (8) Provides alert level associated with a discovered object; (9) Automatic threat recognition (ATR); (10) Not an invasion of privacy (the resolution of the 3D microwave image is low, and the ATR does not need to display a 3D image); (11) a 3D video system; and (12) Simultaneous real-time inspection of the body and any carried luggage (e.g., hand luggage, luggage with wheels moved by handle, etc.).

FIG. 4 provides a diagram detailing the algorithm used by the processing software. This algorithm ultimately issues an alarm for potentially threatening dielectrics or other explosives attached to and hidden on a given inspected target, which is used to create a reconstructed microwave image with a video image superimposed for correlation, detection, and faster location and acquisition of a hazardous material. There are three units which receive, process, and/or send information. The microwave data processing unit 100 is comprised of a data acquisition center 110 and a 3D microwave image restoration center 111. The stereo video data processing unit 200 is comprised of a video data acquisition center 221, a 3D video image restoration center 222, and a target area definer 223. The analysis and decision-making unit 300 is comprised of an image analyzing center 333 and alarm 334 or no-alarm 335 centers. Receiving antennae 3, 4 receive microwave data reflected from and/or transmitted through a target in an inspection zone. The receiving antennae 3, 4 share this data with the microwave data acquisition center 110, which, in turn, further sends the data to the 3D microwave image restoration center 111. Simultaneously, stereo video data captured by video cameras 7, 8 is shared with the video data acquisition center 221, which, in turn, sends the video data to the 3D video image restoration center 222. The 3D video image restoration center 222 then sends the video data through the target area definer 223. The target area definer 223 communicates with the 3D microwave image restoration center 111 in order to correspond (or synchronize) microwave data with video data, thus allowing for release of information regarding the same time span, sending this synchronized data to the analysis and decision-making unit 300. Common analysis of 3D microwave images and 3D video images occurs in the image analyzing center 333, which receives data from the 3D video image restoration center 222 of the stereo video data processing unit 200 (both before and after the video data is filtered by the target area definer 223) as well as from the 3D microwave image restoration center 111 of the microwave data processing unit 100. Finally, the image analyzing center 333 determines, based on all acquired data and using the methods described herein, whether an alarm is signaled 334 or no alarm is signaled 335.

Automated Threat Recognition (ATR).

An alarm is signaled if, after analyzing the volume, mass, shape, and dielectric constant of an object or objects detected on target, e.g., hidden under the clothes or in luggage, a parameter or the combination parameters exceeds or lies within the boundaries of established or preset limits and thresholds. The alarm signal is sent automatically after processing 3D microwave and video images without the need for an operator. The alarm can be sent using wireless networks, cable networks, and mobile networks, to a given display/computer of any surveillance, security, or complex video tracking system. In addition to the automatic alarm, a photo/video image of any potential threat (and person who carries this threat) can be transmitted in real time, with the coordinates of his/her location.

Standoff Detection at a Distance (Up to 10 Meters).

In order to obtain a minimal microwave image, at least one transmitting and two receiving antennas are required, or vice versa, i.e., one receiving and two transmitting antennas. In order to detect objects hidden on targets moving at distance, an array (or plurality), rather than one set, of transmitting and receiving antennas is recommended. The array of transmitting and receiving antennas widens the inspection zone, increases system resolution by increasing the system's aperture, and improves signal/noise correlation. For example, one embodiment of the antenna array comprises 256 elements which are combined into 16 lines of antennas. Each line includes 16 elementary antennas (16×16). This array also includes separate antennas preferably located at a distance which is less than half the wavelength at the maximum frequency of a used band of frequencies. This is necessary for unequivocal reconstruction of 3D microwave images.

The emission of the elementary antenna is continuous (or impulsive). The reflected signal is received simultaneously by all receiving antennas. In the case of several emitting antenna arrays being used, working simultaneously, low frequency modulation is used to distinguish signals coming from the different emitting antenna arrays. To improve the signal/noise ratio, one elementary antenna from the antenna array can emit, at one moment, one of the 16/32 chosen frequencies. The width of emitted lines is narrow (i.e., the width is 3 orders less than the frequency value), which allows the signal to not coincide with external and background frequencies.

The receiving antenna array includes separate antennas located in positions such that the zone/area where reflected signals are received (antenna perspective) allows one to get a 3D microwave image from different sides (or aspects) of the moving target(s). The quantity of separate antennas is determined by the desired quality of the synthesized aperture, resolution, signal/noise rate, and resources. In real time, the 3D microwave image reconstruction speed is about 10 frames/images per second. The recording speed of amplitude-phase distribution data from all pairs [1024×8] of transmitting-receiving antennas and at all 16/32 chosen frequencies allows for consideration of moving targets as almost or quasi static during the time of one frame recording. The speed of data processing and 3D microwave image (frame) reconstruction is determined by the available resources. The attained speed of 10 frames/images per second is achieved due to the distribution of computational resources among different processors (and parallel computing), which work simultaneously but on different tasks, which comprise the data acquisition process, 3D microwave image reconstruction and processing, and 3D video image processing and synchronization.

Real Time Inspection and Detection Rate.

Explained here are the conditions for and rate of data acquisition and processing for a moving target monitored by the present invention: The time needed to measure one frame (i.e., to get the amplitude-phase distribution data from all pairs [1024×8] of transmitting-receiving antennas and at all 16/32 chosen frequencies to reconstruct the 3D microwave and 3D video images) should be less than the time needed for a target to move at ⅛ of the wavelength at the maximal frequency of the used frequency range. The time for one frame measurement is less than 2 milliseconds. Frame processing (reconstruction into 100×100×32 (H×W×D) of points on the 3D microwave and 3D video images) takes about 100 milliseconds. One-eighth (⅛) of the wavelength at the maximal frequency (i.e., 18 GHz or 1.6 cm) is about 0.2 centimeters. The average speed of the movement of a target is 5 km/h (or 1.4 m/s, or 0.14 cm/ms). At the present speed of data acquisition and processing, the present invention can create about 10 frames per second.

Inspection of Many Targets Simultaneously.

If there are several targets within or moving through the inspection area, the system operates and data acquisition is performed in the same manner, taking the same amount of time as for one target. However, when the system is performing 3D microwave and 3D video image reconstruction, it locates automatically all targets and objects within the inspection area, thus requiring more computational resources. Thus, the 3D microwave and 3D video image reconstruction is performed, still in real time, by adjusting a particular quality, speed, or resolution to maintain computational speed. For example, computational speed can be maintained by lowering the reconstructed frame frequency (e.g., adjusting from 10 frames per second to 5 frames per second), or by lowering the number of points of the reconstructed microwave images. Alternatively, increasing computational resources would resolve the issue of many simultaneous targets without the need for lowering any particular quality, speed, or resolution. Use of the video data can also help to lower the volume of microwave data actually processed (e.g., inspecting only the area where objects are detected), thus performing separate inspections simultaneously for each target detected.

An alarm is signaled after analysis within the analysis and decision-making unit. The unit analyzes several frames stored in the computer's memory and singles out targets with "dangerous" objects. A "history" of frames is continuously built and stored in the computer memory. Each frame or group of frames has a time stamp showing when it was taken. An alarm is signaled and sent automatically in real time. A possible delay of a fraction of a second, compared to the time when the frame was received, might occur if several frames from the history are processed. The "history" of frames remains on the computer memory for the time during which targets remain or move within the inspection area. If there is no one inside the inspection area at a given moment, the system operates in "stand-by" mode. The system automatically switches to data acquisition mode and begins processing data as soon as a target(s) enters the inspection area. When target(s) are moving inside the inspection area (at a distance of up to 10 meters from the device), the system, on average, takes, reconstructs, and records into the "history" about 100 frames (the speed is 10 frames per second). A target (e.g., a person) in these frames is shown from different aspects as he/she was "seen" by the antenna during his/her movement. If the target moves during the processing of the frames, where the processing includes those frames from the recorded "history" of frames, hidden objects can be detected-objects that cannot be detected if the person is standing in place.

Covert Inspection and Installation.

To make the operation of the device unnoticeable, the system can be masked as a typical advertising panel. The panel can be made of materials that are penetrated by microwaves (e.g., plastic, wood, fabric, etc.).

3D Video System.

A 3D video system is integral to the present invention. At least 2 video cameras are used, allowing for reconstruction of a "depth map" of the inspection space in real time. The depth map is used together with 3D microwave images in processing and forming a common, synchronized 3D coordinate system. The 3D video image is used to: (1) detect/locate people inside the inspection area; (2) locate and limit specific areas/space within the inspection zone, where the microwave image of targeted objects (e.g. objects hidden on a person's body or in luggage) has to be reconstructed, processed, and/or synchronized; (3) obtain the first border (i.e., the air/dielectric border) on the microwave image, which is the same as the video image "clothes/dielectric border;" (4) transmit to responding officers an automatic alarm signal and photo/video data about a potential threat (e.g. terrorist) including, but not limited to, his/her space coordinates. The photo/video images can be colored or black and white. While a target(s) is (are) moving inside the inspection area or microwave/video system's operation area, the computer stores, in its memory, microwave and video images (10 frames per second) received by the system from different viewing angles or aspects. This information is better and more useful than information about static (non-moving) targets inside the inspection area. The detection algorithm uses the moving target (i.e. better) information to analyze several frames stored in the history of frames. The more frames there are, employing different viewing angles, the more information the system has to automatically detect dangerous objects, and the more effective and accurate the detection procedure will be.

AMD Configuration Options.

The present invention can operate (1) continuously or (2) in "stand-by" mode, activated by an external trigger (e.g., when a target enters the inspection area or a microwave/video system's operational area). The device can operate indoors or outdoors and in different light conditions (e.g., if there is little light, IR-cameras can be used). The system can be set up employing different configurations (transmitting and receiving antenna arrays can be located differently relative to each other) depending on the specific scenario of its use in certain places.

Figure 5:
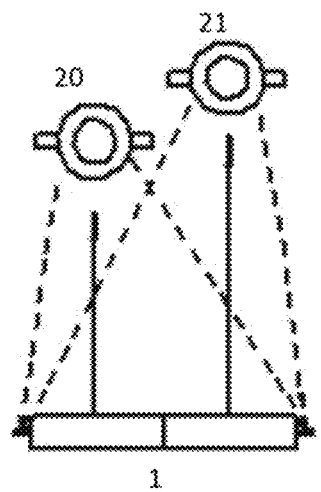
FIG. 5 shows the plane configuration option of the present invention.

The "plane" configuration (see FIG. 5) refers to the transmitting 2 and receiving antenna arrays 7, 8 being fixed on one frame or module of the setup 1. In "plane" configuration, the system uses only one technology to detect potentially dangerous objects, hidden on a target or in the luggage (e.g., backpack, bag, suitcase, etc.), the technology being "reflection" of the primary radiation (emitted by the microwave antenna arrays) off the target. In "plane" configuration, the inspection area is wider than in the "portal" configuration (explained below), thus potentially making it more useful for standoff detection of dangerous objects on one person 20 or several persons 20 and 21 simultaneously at a distance of several meters. Using the "plane" configuration, a 3D MW image can be constructed, and calculation of the presence of a hidden dielectric object depends on the phase difference between reflections off the first and second borders of a target. It should be noted that more sets of microwave signal receivers and transmitters, located at different angles to the inspection area and targets, will yield more accurate and more informative results.

Figure 6:
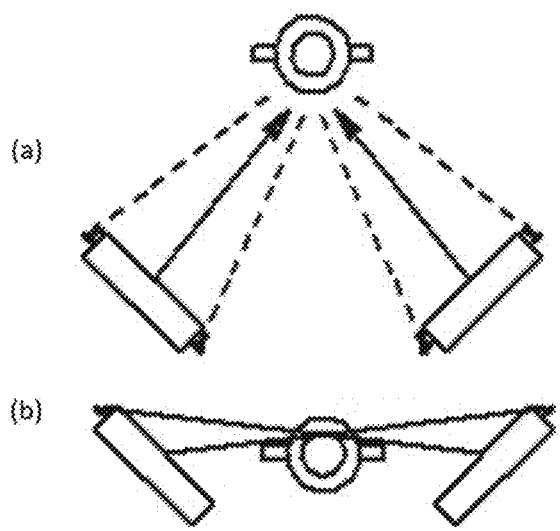
FIG. 6 shows the portal configuration option of the present invention in (a) reflection mode, and (b) transmission mode.

The "portal" configuration (see FIG. 6) refers to the receiving and transmitting antennas being located on both sides of a so-called portal (i.e. a walk-though area), positioned at an angle towards the direction of movement of the target(s). In this configuration, the system uses two technologies to detect potentially dangerous objects hidden on a target or in luggage. The first technology is "reflection" of the primary radiation (emitted by the microwave antenna arrays) off of the target(s), and the second technology is "transmission" of the primary microwave radiation through the object. FIG. 6(*a*) shows how the "reflection" technology is employed, while FIG. 6(*b*) shows how the "transmission" technology is employed. With reflection technology, the detection of hidden objects is performed in a way similar to that of a plane configuration (i.e. based on the difference between phases of reflected microwaves). With transmission technology, the microwave signal will travel through a hidden dielectric object, if present, and thus no reflection of microwaves occurs. Instead, signal receivers/detectors are set up opposite signal transmitters in order to receive a microwave transmitted through a hidden dielectric object located on the body or in luggage. The detection of an object and thickness calculation is achieved by measuring the phase delay, if any, of a wave passing through the object. No 3D MW image is constructed based on transmission technology; instead, it simply measures the phase delay of microwaves travelling through hidden objects, if present. The phase delay is caused by the microwave transmission through a medium with a high dielectric constant (e.g., about 3 for explosive materials). It should again be noted that more sets of microwave signal receivers and transmitters (e.g., other than directly perpendicular to the direction of a moving target), located at different angles to the inspection area, will yield more accurate and more informative results.

Figure 7:
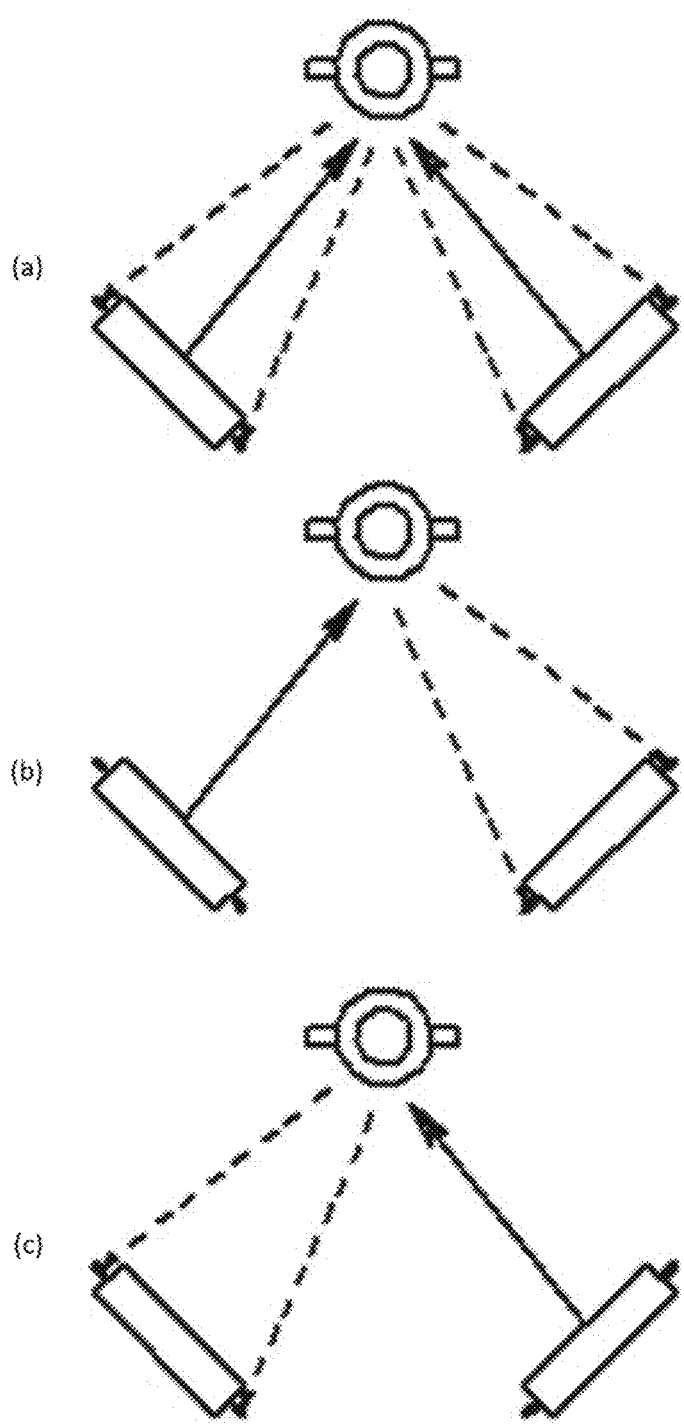
FIG. 7 shows different manners of constructing microwave images in the portal configuration option of the present invention.

In the "portal" configuration, the detection algorithm uses processes data from both technologies. The system can signal the alarm using data received from only one of the technologies (transmission or reflection), or alternatively, the system can signal using a common alarm, which is determined by "OR" logic applied to both signals (if there is an alarm signal for one of the technologies). The detection algorithm simultaneously uses data from one or several microwave images created by the "reflection" mode. Different microwave images are formed while a signal is emitted/received by emitting/receiving antennas located on one half of a given portal unit, either from the left-hand side or from the right-hand side relative to the direction of the movement of the target(s). Crossover microwave images are formed while the signal is emitted/received by emitting/receiving antennas located in the different blocks (halves of the portal unit). When the left-hand side emits, the right-hand side receives the signal, and vice versa (see FIG. 7).

Figure 8:
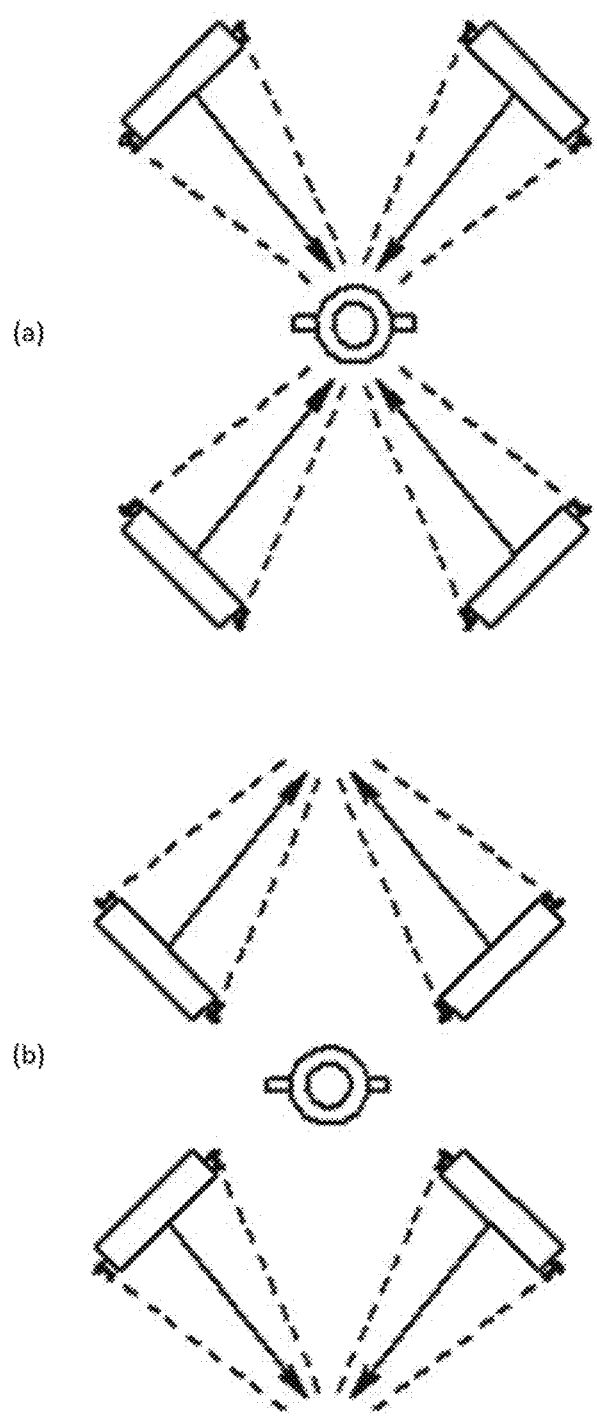
FIG. 8 shows the portal configuration option of the present invention using a double number of emitting/receiving antenna arrays.

Using several microwave images during the analysis (received from the left and right sides of the portal and from crossover images) allows for more viewing angles of a target (e.g., human) body and hidden objects, increasing the accuracy of the automatic alarm signal and detection rate. This way, the system can detect objects that can't be seen by just one of the portal's halves, for example from the back, from a side, or from the front side of a target. In the "portal" configuration, the detection algorithm allows one to detect simultaneously objects located on the side or on the front side of the target in "reflection" mode, and from the back and front sides of the target in the "transmission" mode. In the "portal" configuration with a double number of emitting/receiving antenna arrays (see FIG. 8), located in pairs from different sides (i.e., from the left and right) relative to the direction of the movement of a target, images of targets are received from different viewing angles and from all sides (front, back, left, and right). The detection algorithm allows one to detect objects on the sides or on the front and back sides of the body in "reflection" mode and on the front/back sides of the body in "transmission" mode. In this case (FIG. 8), the quantity of single and crossover images increases, and so does the accuracy of the automatic alarm signal and detection rate. Objects hidden in any place on the body can be detected (i.e., a pseudo-3D holographic image).

Figure 9:
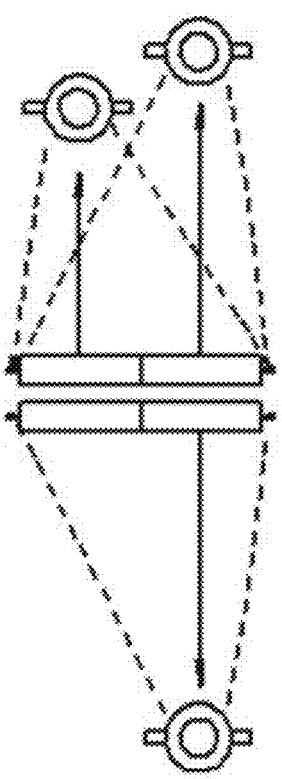
FIG. 9 shows the plane configuration option of the present invention using a double number of emitting/receiving antenna arrays.

In "plane" configuration employing a double number of emitters/receivers, where the first and the second units are emitting/receiving microwave radiation in different directions, dangerous objects on the front side of a target are detected when the target is moving towards the system, while objects on the back side of the body (e.g. in the backpack) are detected as the target is moving away from the system. In this type of "plane" configuration, detection is performed from the front and from the back sides simultaneously (see FIG. 9).

Figure 10:
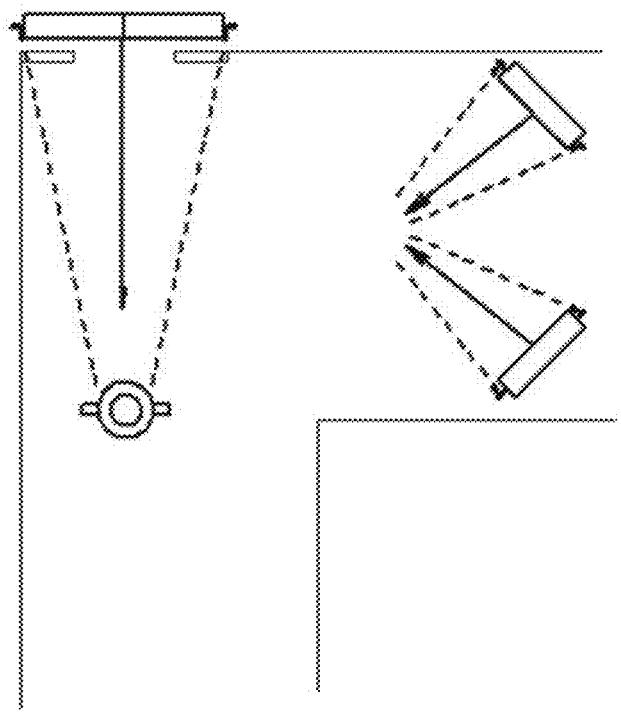
FIG. 10 shows an example of how the plane and portal configuration options can be used together simultaneously.
Figure 11:
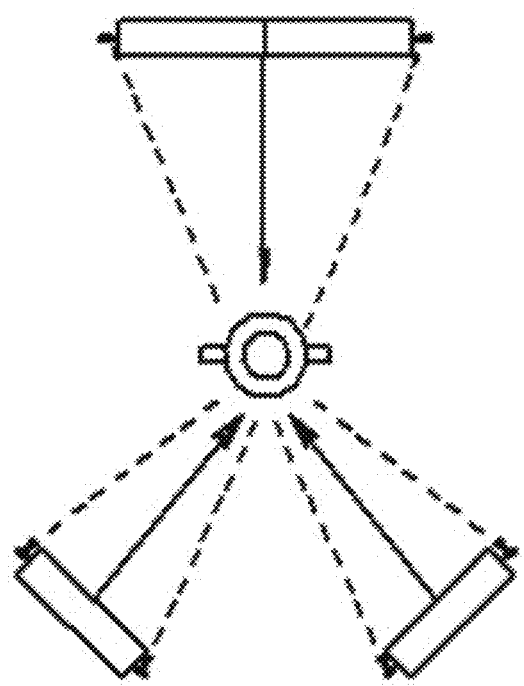
FIG. 11 shows another example of how the plane and portal configuration options can be used together simultaneously.

Additionally, scenarios might exist where the two configuration modes are used together and in combination (i.e. at least one portal configuration, and at least one plane configuration). The following two embodiments provide examples of, but in no way limit, how the plane and portal mode systems can be combined for further detection:

In a "plane" configuration, primary standoff detection of dangerous objects on the body of the moving person is performed. An automatic alarm signal is sent to a "portal" system, which, using the two technologies (reflection and transmission), inspects either all targets in the inspection area or only those targets singled out by the "plane" configuration system. In this scenario (see FIGS. 10 and 11, for examples of various setups), the probability and accuracy of dangerous object detection increases and the false alarm rate is low. A low false alarm rate is a very important aspect, especially for detection systems operating in mass transportation facilities or areas with high passenger flow. A high false alarm rate would potentially fully disable the operations of a public transport hub, ruin a public event, etc.

In a "portal" configuration, primary detection of dangerous objects hidden on the front and back sides of a moving target is performed using the two technologies (reflection and transmission). An automatic alarm signal is sent to a "plane" system, which performs a secondary inspection, either of all targets in the inspection area or only of those targets singled out by the "portal" system. In this scenario (see FIGS. 10 and 11, for examples of various setups), the probability and accuracy of dangerous object detection also increases, and the false alarm rate is similarly low. To implement this type of scenario, after the system in "portal" configuration, an automatic door, gate, barrier, etc., could be positioned to divide people into two flows. The first flow would include targets on which the first system detected dangerous objects, and those targets would be sent to a second system employing the other configuration ("plane" or "portal") for a secondary inspection.

When several systems in the "plane" and "portal" configurations are operating simultaneously in different parts of an inspected area (e.g., in transit stations or public event entrances) and detect a dangerous object, an automatic alarm signal is sent to the central control panel of the security system. Together with the alarm signal, the number of the responding device, photo/video images, and the coordinates of the suspicious target are transmitted. For specific cases, the system can be equipped with special mechanical devices, doors, revolving doors, barriers, etc., which can be used to automatically block, reroute, separate, or sequester suspicious targets/persons if an alarm is signaled. The more systems there are, all of which are coordinated with and connected to one control and data processing unit, the more effectively data processing resources can be distributed and the higher the probability and accuracy of detection will be, while also minimizing false alarms.

Safe Operation and Radiation.

The total microwave power of the present invention is 2 V/m (10 GHz), which is 30 times less than that allowed in a public area (61 V/m).

Privacy Concerns.

The resolution of the 3D microwave image is low and the ATR doesn't need to display the 3D image. To form the alarm signal automatically (ATR), it is not necessary for an operator to look through 2D/3D microwave or video images on the display manually. The microwave image resolution is about 4 cm (relative to the used frequency range) and it is impossible to show/record any parts of the body of a person located within the system's operational area.

System Resolution.

The system resolution in plane configuration is determined by an average frequency (13 GHz), the distance to the object, and a given aperture's dimensions (e.g., system resolution in plane configuration is 4×4 cm at distance of 1 meter, not considering aperture synthesis). The system resolution in the direction perpendicular to the first and the second boundaries is determined by the bandwidth of the used frequency range (8-18 GHz) (e.g., system resolution in depth is 1.5 cm).

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A method for unveiling hidden dielectric objects in an interrogated space, comprising:
    sending microwave (MW) signals from MW sources towards an interrogated person,
    the signal being partially reflected on a first boundary between air and an outer layer of an intermediary space, the remainder of the signal being almost fully reflected on a second boundary between the intermediary space and a human body,
    receiving at a MW receiver a first and a second response of MW signals reflected back from the first boundary and the second boundary; the first and the second response signals being a first and a second 3D MW images of the interrogated person;
    determining at least two optical paths, P1 and P2, between at least two sets of two points, where P1=(A2−A1) and P2=(B2−B1); where A1 is a point of a first MW beam reflecting from the first boundary, and A2 is a point of the same first beam reflecting from the second boundary, where B1 is a point of a second MW beam reflecting from the first boundary, and B2 is a point of the same second MW beam reflecting from the second boundary,
    wherein the optical path is a path of microwave radiation in a medium of the intermediary space;
    determining a presence of a hidden dielectric object between the first and second boundaries if the difference between P1 and P2 is greater than a threshold value due to an increased dielectric constant in the intermediary space between B2 and B1.

2. The method of claim 1, wherein the threshold value is about 1 cm.

3. The method of claim 1, further comprising forming at least a third and a fourth 3D MW image from a third and a fourth response signal; wherein the third and the fourth response signals are received from an angle different from that of the first and the second response signals, and determining at least two more optical paths, P3 and P4, where P3=(C2−C1) and P4=(D2−D1), where C1 is a point of a third MW beam reflecting from the first boundary, and C2 is a point of the same third beam reflecting from the second boundary, where D1 is a point of a fourth MW beam reflecting from the first boundary, and D2 is a point of the same fourth MW beam reflecting from the second boundary, thus increasing image quality and adding information for determining the presence of hidden dielectric objects.

4. The method of claim 1, further comprising using of MW radiation travelling through the intermediary space without any reflection from the human body by:
    registering an amplitude and phase a MW radiation travelled through the intermediary space without reflection from the human body;
    determining the presence of hidden dielectric object if a phase delay in the registered signal exceeds a phase threshold, the delay caused by passing the intermediary space with increased dielectric constant.

5. The method of claim 1, further comprising forming a 3D optical range image of the interrogated person, synchronizing the 3D optical range image with a 3D MW image at the same point in time, and superimposing the 3D optical range image with the first 30 MW image, thus improving accuracy of determining the presence of hidden dielectric objects.

6. The method of claim 1, wherein the hidden objects are explosive materials or components thereof.

7. The method of claim 1, wherein the MW sources have a spectrum comprising multiple frequencies.

8. The method of claim 1, wherein the MW sources scan the area, thus forming images.

9. The method of claim 1, wherein more than 100 MW sources are used to form 3D images.

10. The method of claim 1, wherein a digital signal processor (DSP) performs a coherent processing, which calculates the 3D MW images, taking into account amplitude information and phase information of electromagnetic fields reflected from an interrogated person.

11. The method of claim 1, wherein the method is used to unveil hidden suicide bombs in a crowd of moving people.

12. The method of claim 1, wherein the method is used to inspect at least two interrogated persons simultaneously.

13. The method of claim 1, wherein the interrogated person is moving at a speed of at least 5 km/hour.

14. A system for unveiling a hidden dielectric object in an interrogated area, comprising:
- at least two microwave (MW) sources and at least one MW receiver forming 3D MW images of the interrogated area;
- wherein said 3D microwave images are formed by emitting MW signals from the MW sources towards an interrogated person, where each MW signal partially reflects off a first boundary between air and an intermediary space and a remainder of the MW signals travels through the intermediary space, where the remainder of the MW signals almost fully reflects off a second boundary between the intermediary space and a human body of the interrogated person, where said MW receiver receives reflected signals from said first and second boundaries;
- a computer/calculator for determining at least two optical paths, P1 and P2, between at least two sets of two points, where P1=(A2−A1) and P2=(B2−B1); wherein A1 is a point of a first MW beam reflected from the first boundary, and A2 is a point of the same first MW beam reflected from the second boundary, wherein B1 is a point of a second MW beam reflected from the first boundary, and B2 is a point of the same second MW beam reflected from the second boundary, wherein the optical path is a path of microwave radiation in an intermediary space medium;
- and an alarm for signaling a likelihood of a hidden dielectric object between the first and second boundaries if the difference between P1 and P2 is greater than a threshold value due to an increased dielectric constant in the intermediary space between points B2 and B1.

15. The system of claim 14, further comprising:
- at least two cameras recording optical images of the interrogated person and forming a 3D optical range image of the interrogated person,
- and a computer for synchronization in time and superimposition in digital space of the 3D optical range image with the 3D MW image reflects off a first boundary, thus improving accuracy of determining the first boundary position and advancing detection of hidden objects.

16. The system of claim 14, further comprising:
- an additional MW receiver registering a MW signal travelling through the intermediary space without reflection;
- and the alarm signaling a likelihood of the hidden dielectric object between the first and second boundaries if the additional receiver has registered a phase delay of an incoming MW signal passed through the intermediary space; the delay caused by the presence of an object with the increased dielectric constant in the intermediary space.

17. The system of claim 14, wherein the hidden objects are explosive materials or components thereof.

* * * * *